US007990497B2

(12) United States Patent
Jang

(10) Patent No.: US 7,990,497 B2
(45) Date of Patent: Aug. 2, 2011

(54) ACTIVE MATRIX TYPE DISPLAY DEVICE WITH DIFFERENT DISTANCES FROM PIXEL ELECTRODES AND GATE LINES

(75) Inventor: Yong Ho Jang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 562 days.

(21) Appl. No.: 12/003,616

(22) Filed: Dec. 28, 2007

(65) Prior Publication Data

US 2008/0231790 A1 Sep. 25, 2008

(30) Foreign Application Priority Data

Mar. 20, 2007 (KR) ........................ 10-2007-0027126

(51) Int. Cl.
*G02F 1/1335* (2006.01)
*G02F 1/1343* (2006.01)
*G09G 3/36* (2006.01)

(52) U.S. Cl. ........ 349/106; 349/107; 349/108; 349/142; 349/143; 345/88; 345/103

(58) Field of Classification Search .......... 349/106–108, 349/142–146; 345/83, 84, 88, 93, 103
See application file for complete search history.

(56) References Cited

U.S. PATENT DOCUMENTS 5,151,689 A 9/1992 Kabuto et al.
6,225,967 B1 5/2001 Hebiguchi
7,619,641 B2 * 11/2009 Shih et al. ..................... 345/694
2007/0229422 A1 * 10/2007 Hung .............................. 345/88
2007/0252797 A1 * 11/2007 Huang et al. .................... 345/87

FOREIGN PATENT DOCUMENTS

EP 0 899 604 A2 3/1999
EP 1 174 849 A2 1/2002
GB 2 146 478 A 4/1985

* cited by examiner

*Primary Examiner* — Hoan C Nguyen
(74) *Attorney, Agent, or Firm* — Morgan, Lewis & Bockius LLP

(57) ABSTRACT

An active matrix type display device is disclosed, to reduce a fabrication cost, which comprises first to third gate lines arranged at one direction; first and second data lines arranged orthogonally to the first to third gate lines; a first pixel cell connected to the first gate line and the first data line; a second pixel cell connected to the first gate line and the second data line; a third pixel cell connected to the second gate line and the first data line; a fourth pixel cell connected to the second gate line and the second data line; a fifth pixel cell connected to the third gate line and the first data line; and a sixth pixel cell connected to the third gate line and the second data line, wherein the three predetermined pixel cells of displaying the different colors among the first to sixth pixel cells constitute a first unit pixel for displaying a first unit image; and the three other pixel cells except the pixel cells included in the first unit pixel constitute a second unit pixel for displaying a second unit image.

2 Claims, 7 Drawing Sheets

ACTIVE MATRIX TYPE DISPLAY DEVICE WITH DIFFERENT DISTANCES FROM PIXEL ELECTRODES AND GATE LINES

This application claims the benefit of Korean Patent Application No. P2007-27126 filed Mar. 20, 2007, which is hereby incorporated by reference as if fully set forth herein.

BACKGROUND OF THE INVENTION

1. Field of the Invention

The present invention relates to an active matrix type display device, and more particularly, to an active matrix type display device to reduce a fabrication cost.

2. Discussion of the Related Art

In general, a liquid crystal display device displays desired images by controlling light transmittance of liquid crystal cells in response to a video signal. Especially, an active matrix type liquid crystal display device is suitable for displaying moving pictures since a switching element is provided in each of pixel cells. In this case, the switching element is formed of a thin film transistor (hereinafter, referred to as "TFT"), typically. The liquid crystal display device includes a plurality of gate and data lines crossing each other, to thereby define the plurality of pixel cells.

FIG. 1 is a diagram illustrating a pixel structure of a related art liquid crystal display device. As shown in FIG. 1, the related art liquid crystal display device includes a plurality of gate lines GL and data lines DL, wherein each gate line GL is positioned orthogonal to each data line DL, thereby defining a pixel region. Then, a pixel cell is formed in the pixel region. At this time, the pixel cell includes a red(R) pixel cell to display a red color, a green(G) pixel cell to display a green color, and a blue(B) pixel cell to display a blue color. The red(R) pixel cell, the green(G) pixel cell and the blue(B) pixel cell constitute one unit pixel PXL to display a unit image.

Since one unit pixel PXL is comprised of the three pixel cells, at least one gate line GL and at least three data lines DL are necessarily provided to drive one unit pixel. Accordingly, the related art display device requires the gate lines GL whose number is much larger than that of the data lines DL.

Although not shown, the related art liquid crystal display device includes a gate driver to drive the gate lines GL, and a data driver to drive, the data lines DL. The gate driver includes a plurality of gate driving integrated circuits which dividedly drive the gate lines GL separated by groups. The data driver includes a plurality of data driving integrated circuits which dividedly drive the data lines DL separated by groups. Typically, the data driving integrated circuit is more expensive than the gate driving integrated circuit.

Accordingly, the related art liquid crystal display device has the following disadvantages.

The related art liquid crystal display device is provided with the large number of data lines, whereby the fabrication cost is increased.

SUMMARY OF THE INVENTION

Accordingly, the present invention is directed to an active matrix type display device that substantially obviates one or more problems due to limitations and disadvantages of the related art.

An object of the present invention is to provide an active matrix type display device which decreases the number of relatively high-priced data driving integrated circuits, and increases the number of relatively low-priced gate driving integrated circuits, to reduce a total fabrication cost.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an active matrix type display device comprises first to third gate lines arranged at one direction; first and second data lines arranged orthogonally to the first to third gate lines; a first pixel cell connected to the first gate line and the first data line; a second pixel cell connected to the first gate line and the second data line; a third pixel cell connected to the second gate line and the first data line; a fourth pixel cell connected to the second gate line and the second data line; a fifth pixel cell connected to the third gate line and the first data line; and a sixth pixel cell connected to the third gate line and the second data line, wherein the three predetermined pixel cells of displaying the different colors among the first to sixth pixel cells constitute a first unit pixel for displaying a first unit image; and the three other pixel cells except the pixel cells included in the first unit pixel constitute a second unit pixel for displaying a second unit image.

In another aspect of the present invention, an active matrix type display device comprises first to sixth gate lines arranged at one direction; data lines arranged orthogonally to the first to sixth gate lines; a first pixel cell connected to the first gate line and the data line; a second pixel cell connected to the second gate line and the data line; a third pixel cell connected to the third gate line and the data line; a fourth pixel cell connected to the fourth gate line and the data line; a fifth pixel cell connected to the fifth gate line and the data line; and a sixth pixel cell connected to the sixth gate line and the data line, wherein the three predetermined pixel cells of displaying the different colors among the first to sixth pixel cells constitute a first unit pixel for displaying a first unit image; and the three other pixel cells except the pixel cells included in the first unit pixel constitute a second unit pixel for displaying a second unit image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an active matrix type display device according to the present invention will be explained with reference to the accompanying drawings.

First Embodiment

Figure 2:
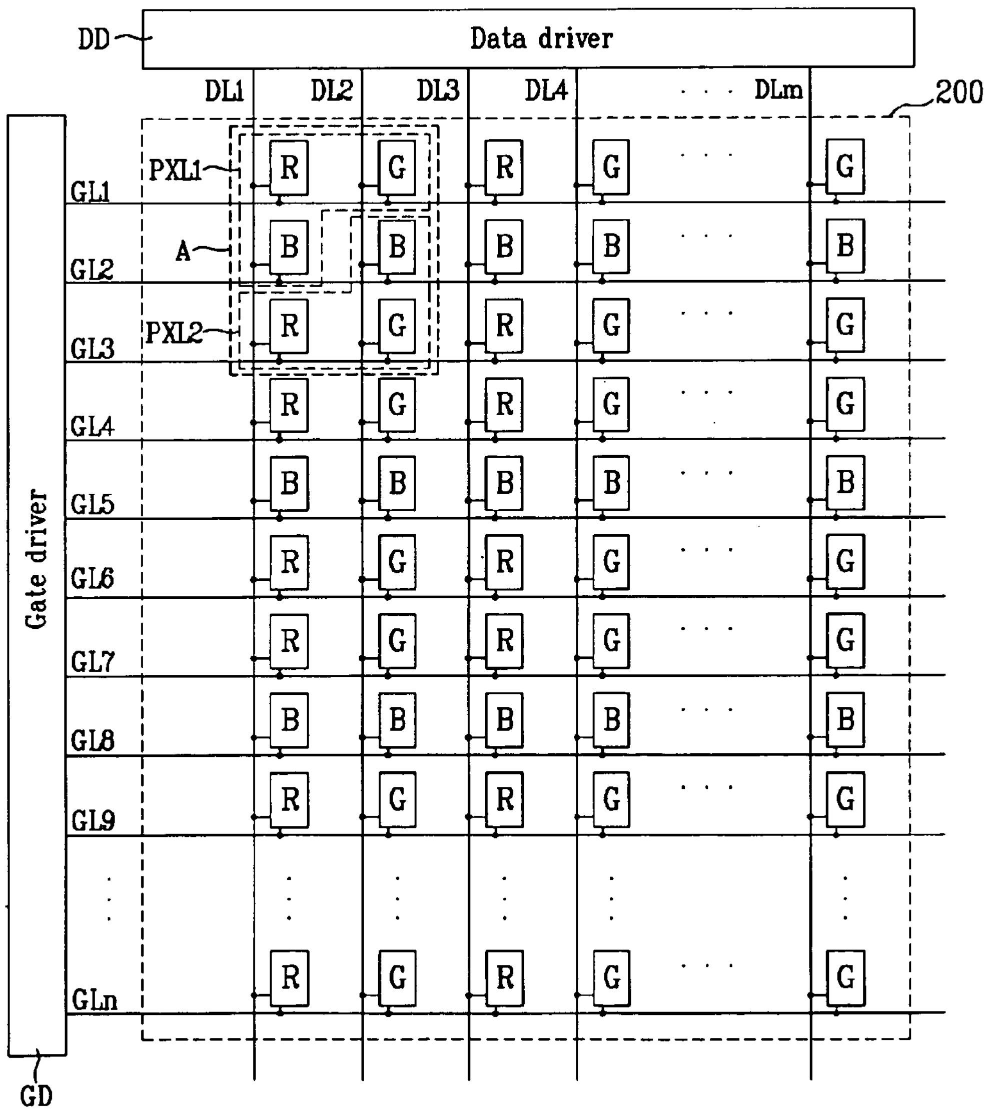
FIG. 2 is a diagram illustrating an active matrix type display device according to the first embodiment of the present invention.

FIG. 2 is a diagram illustrating an active matrix type display device according to the first embodiment of the present invention.

As shown in FIG. 2, the active matrix type display device according to the first embodiment of the present invention includes a panel having a plurality of pixel cells R, G, B to display image; and a gate driver GD and a data driver DD to drive the panel 200.

The panel 200 includes a plurality of gate lines GL1 to GLn and a plurality of data lines DL1 to DLm, wherein the gate line GL is orthogonal to the data line DL.

At the right side of each of the data lines DL1 to DLm, there is the plurality of pixel cells R, G, B along a data line direction. The plurality of pixel cells R, G, B arranged along the data line direction are connected to the data line positioned at the left side thereof, and are also connected to the gate lines GL1 to GLn, respectively. For example, the pixel cells R, G positioned at the right side of the first data line DL1 are connected to the first data line DL1 in common, and are also connected to the first to 'n'th gate lines GL1 to GLn, respectively.

In case of the related art liquid crystal display device, one data line is connected to the pixel cell of one color. Meanwhile, in case of the active matrix type display device according to the present invention, one data line is connected to the pixel cells of the different colors. For example, the first data line DL1 is connected to the pixel cells arranged in a sequence order of the red(R) pixel cell, the blue(B) pixel cell and the red(R) pixel cell from the upper side thereof; and the second data line DL2 is connected to the pixel cells arranged in a sequence order of the green(G) pixel cell, the blue(B) pixel cell and the green(G) pixel cell from the upper side thereof.

The '2k−1'th data line ('k' is a positive number) is connected to the pixel cells arranged in the same method as that of the first data line DL1; and the '2k'th data line is connected to the pixel cells arranged in the same method as that of the second data line DL2.

At this time, the '3p+1'th gate line ('p' is a positive number including '0') is connected to the red(R) and green(G) pixel cells; the '3p+2'th gate line is connected to the blue(B) pixel cells; and the '3p+3'th gate line is connected to the red(R) and green(G) pixel cells.

The red(R) pixel cell is supplied with a data signal corresponding to a red color, to thereby display a red color. The green(G) pixel cell is supplied with a data signal corresponding to a green color, to thereby display a green color. The blue(B) pixel cell is supplied with a data signal corresponding to a blue color, to thereby display a blue color.

FIG. 2 shows "A" block provided with the two unit pixels. One unit pixel is comprised of the red(R), green(G) and blue(B) pixel cells. Also, one unit pixel PXL1, PXL2 having the pixel cells of the different colors displays one unit image.

"A" block includes the six pixel cells, wherein the three pixel cells of red, green and blue pixel cells constitute the first unit pixel PXL1, and the other three pixel cells of red, green and blue pixel cells constitute the second unit pixel PXL2. Based on this structure of the present invention, it is possible to decrease the number of data lines as compared with that of the related art.

In case of the related art, one data line drives the pixel cell of one color, whereby the number of data lines is largely increased according to the number of colors to be displayed. For the present invention where one data line drives the pixel cells of the different colors, even though the number of colors to be displayed is increased, it is possible to prevent the number of data lines from being increased.

Due to the above-mentioned structure of the present invention, the number of gate lines may increase. The present invention decreases the number of data lines, while the present invention increases the number of gate lines. Accordingly, the present invention is provided with the increased number of gate driving integrated circuits to drive the gate lines as compared with that of the related art. However, the present invention can decrease the number of data driving integrated circuits to drive the data lines. As mentioned above, the data driving integrated circuit is more expensive than the gate driving integrated circuit. Eventually, the present invention decreases the number of data driving integrated circuits and increases the number of gate driving integrated circuits, so that it is possible to reduce the total fabrication cost.

The advantages of the first embodiment of the present invention will be explained in more detail with reference to the accompanying drawings.

Figure 3:
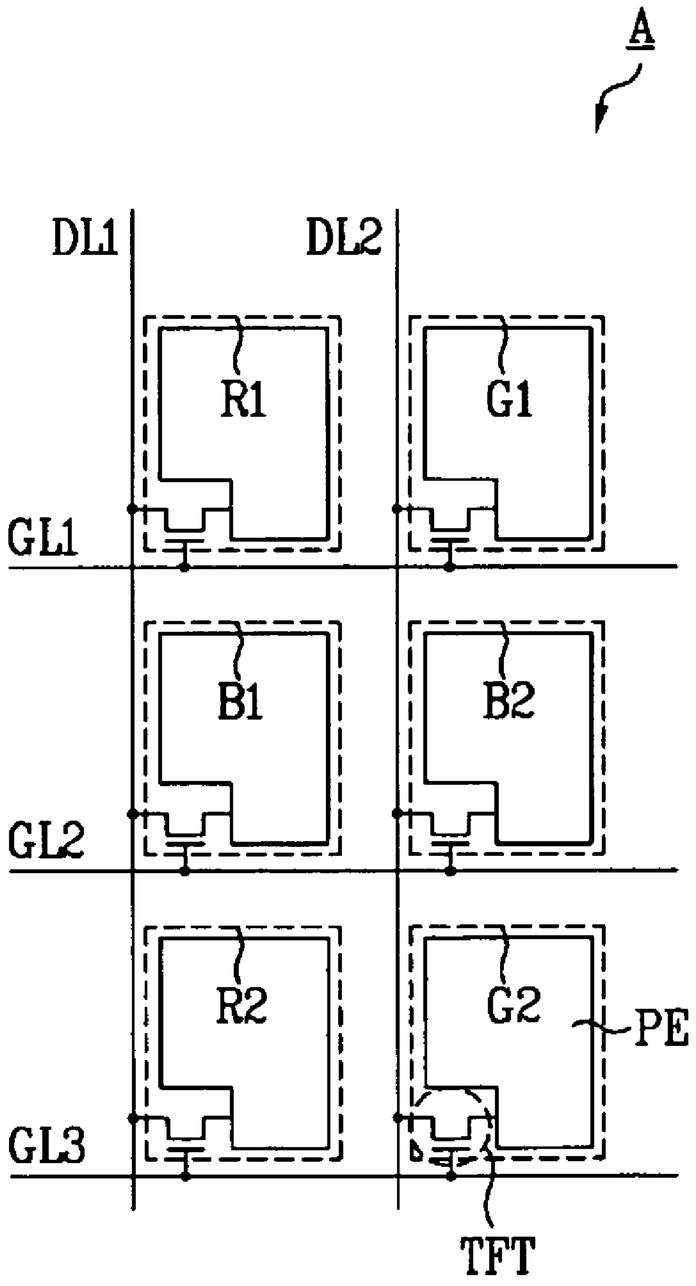
FIG. 3 is a diagram illustrating one exemplary structure in relation with first and second unit pixels shown in "A" block of FIG. 2.

FIG. 3 is a diagram illustrating one exemplary structure in relation with first and second unit pixels shown in "A" block of FIG. 2.

First, each pixel cell includes a thin film transistor TFT which switches a data signal Data from the data line DL in response to a scan pulse from the gate line GL; a pixel electrode PE which is supplied with the data signal from the thin film transistor TFT; a common electrode which is positioned in opposite to the pixel electrode PE; and a liquid crystal layer which is positioned between the pixel electrode PE and the common electrode (not shown), and controls light transmittance based on an electric field generated between the pixel electrode PE and the common electrode (not shown).

FIG. 3 shows the six pixel cells. In FIG. 3, for convenience of the explanation, the red pixel cell positioned uppermost is defined as the first red pixel cell R1, and the red pixel cell positioned lowermost is defined as the second red pixel cell R2. Also, the green pixel cell positioned uppermost is defined as the first green pixel cell G1, and the green pixel cell positioned lowermost is defined as the second green pixel cell G2. The blue pixel cell positioned at the left side is defined as the first blue pixel cell B1, and the blue pixel cell positioned at the right side is defined as the second blue pixel cell B2.

The first red pixel cell R1, the first green pixel cell G1 and the first blue pixel cell B1 constitute the first unit pixel PXL1. Also, the second red pixel cell R2, the second green pixel cell G2 and the second blue pixel cell B2 constitute the second unit pixel PXL2. At this time, the first red pixel cell R1 is connected to the first gate line GL1 and the first data line DL1. The first green pixel cell G1 is connected to the first gate line GL1 and the second data line DL2. The first blue pixel cell B1 is connected to the second gate line GL2 and the first data line DL1. The second blue pixel cell B2 is connected to the second gate line GL2 and the second data line DL2. The second red pixel cell R2 is connected to the third gate line GL3 and the first data line DL1. The second green pixel cell G2 is connected to the third gate line GL3 and the second data line DL2.

Figure 1:
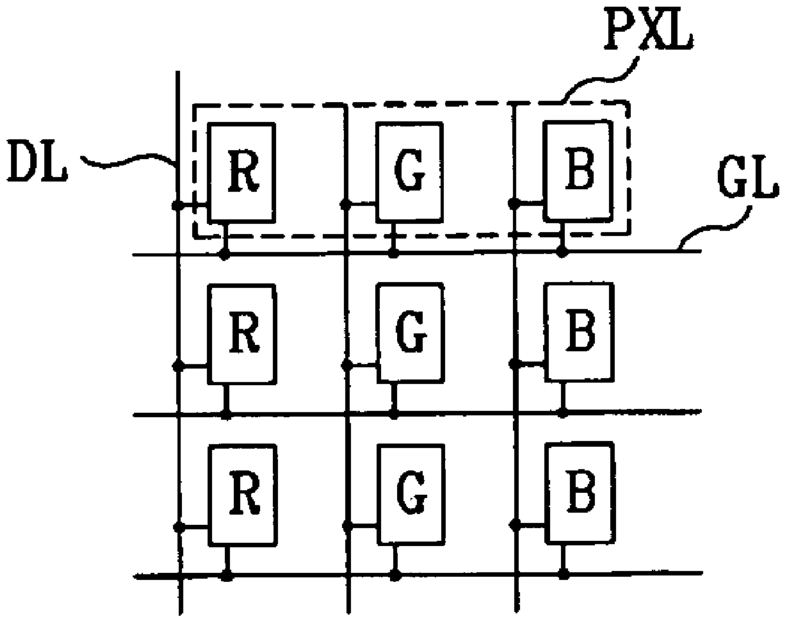
FIG. 1 Related Art
FIG. 1 is a diagram illustrating a pixel structure of a related art liquid crystal display device.

The first and second unit pixels PXL1 and PXL2 comprised of the six pixel cells form the block of 3*2. The first and second unit pixels PXL1 and PXL2 comprised of the six pixel cells are driven by the three gate lines and the two data lines. Meanwhile, in case of the related art of FIG. 1, the first and second unit pixels PXL1 and PXL2 comprised of the six pixel cells are driven by the two gate lines and the three data lines. Thus, the unit pixel included in the active matrix type display device according to the first embodiment of the present invention has one more gate line and one less data line than those of the unit pixel included in the related art liquid crystal display device. Accordingly, the active matrix type display device according to the first embodiment of the present invention is provided with the gate lines whose number is increased by 3/2 (one and a half) times and the data lines whose number is decreased by 2/3 times as compared with those of the related art liquid crystal display device.

For example, the active matrix type display device having XGA degree (resolution ratio of 1024*728) is provided with the 768 gate lines and the 3072 data lines. If this active matrix type display device having XGA degree is changed to the structure of the first embodiment of the present invention, the number of gate lines is increased to 1152 from 768, and the number of data lines is decreased to 2048 from 3072.

Although not shown, the pixel cells included in the first unit pixel PXL1 and the second unit pixel PXL2 may be defined with the other colors instead of the afore-designated colors.

For example, the pixel cell connected to the first gate line GL1 and the first data line DL1 may be defined as the first pixel cell; the pixel cell connected to the first gate line GL1 and the second data line DL2 may be defined as the second pixel cell; the pixel cell connected to the second gate line GL2 and the first data line DL1 may be defined as the third pixel cell; the pixel cell connected to the second gate line GL2 and the second data line DL2 may be defined as the fourth pixel cell; the pixel cell connected to the third gate line GL3 and the first data line DL1 may be defined as the fifth pixel cell; and the pixel cell connected to the third gate line GL3 and the second data line DL2 may be defined as the sixth pixel cell.

At this time, if the first pixel cell displays any one of the red, green and blue colors, the second pixel cell displays another of the two colors except the color displayed in the first pixel cell, and the third pixel cell displays the other except the two colors displayed in the first and second pixel cells. Also, if the fourth pixel cell displays any one of the red, green and blue colors, the fifth pixel cell displays another of the two colors except the color displayed in the fourth pixel cell, and the sixth pixel cell displays the other except the two colors displayed in the fourth and fifth pixel cells.

The first and fourth pixel cells may display the same color; the second and fifth pixel cells may display the same color; and the third and sixth pixel cells may display the same color. Also, the first and fifth pixel cells may display the same color; the second and fourth pixel cells may display the same color; and the third and sixth pixel cells may display the same color. Also, the first and sixth pixel cells may display the same color; the second and fifth pixel cells may display the same color; and the third and fourth pixel cells may display the same color.

In another method, the first and fourth pixel cells may display the same color; the second and sixth pixel cells may display the same color; and the third and fifth pixel cells may display the same color. Also, the first and sixth pixel cells may display the same color; the second and fourth pixel cells may display the same color; and the third and fifth pixel cells may display the same color. Also, the first and fifth pixel cells may display the same color; the second and sixth pixel cells may display the same color; and the third and fourth pixel cells may display the same color.

For example, the first pixel cell may display the red color, the second pixel cell may display the green color, and the third pixel cell may display the blue color. The first pixel cell may display the red color, the second pixel cell may display the blue color, and the third pixel cell may display the green color. The first pixel cell may display the green color, the second pixel cell may display the red color, and the third pixel cell may display the blue color. The first pixel cell may display the green color, the second pixel cell may display the blue color, and the third pixel cell may display the red color. The first pixel cell may display the blue color, the second pixel cell may display the red color, and the third pixel cell may display the green color. The first pixel cell may display the blue color, the second pixel cell may display the green color, and the third pixel cell may display the red color.

Eventually, the first to third pixel cells may be positioned at any portions of the first unit pixel PXL1. Also, the fourth to sixth pixel cells may be positioned at any portions of the second unit pixel PXL2.

Figure 4:
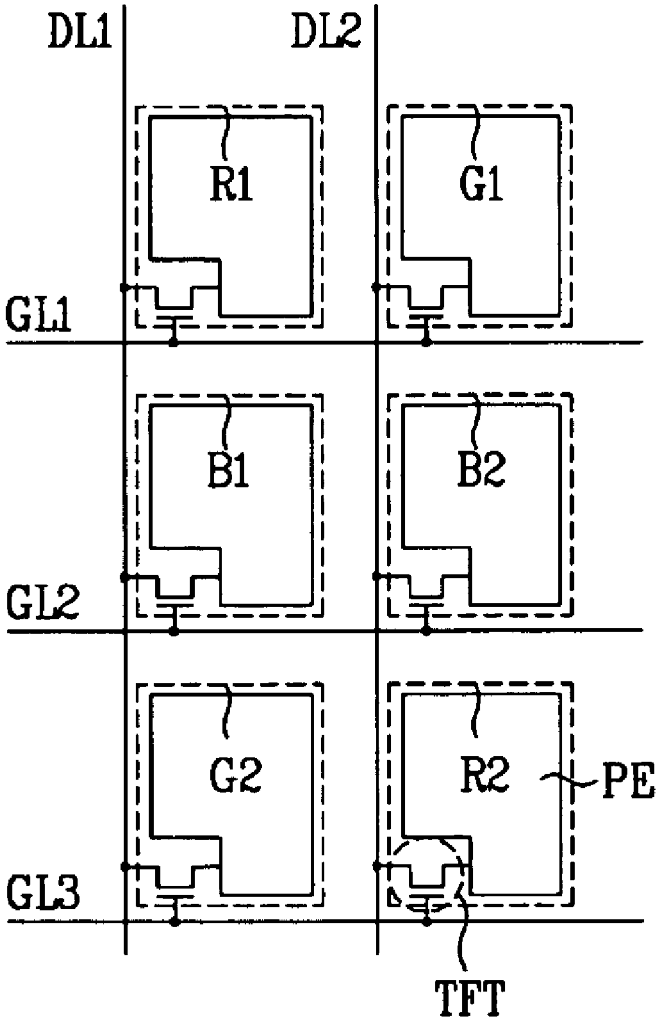
FIG. 4 is a diagram illustrating another exemplary structure in relation with first and second unit pixels shown in "A" block of FIG. 2.

FIG. 4 is a diagram illustrating another exemplary structure in relation with first and second unit pixels shown in "A" block of FIG. 2.

Referring to FIG. 4, the second green pixel cell G2 and second red pixel cell R2 may be changed in position. That is, as shown in FIG. 4, the second green pixel cell G2 may be positioned at the left side, and the second red pixel cell R2 may be positioned at the right side.

Second Embodiment

Figure 5:
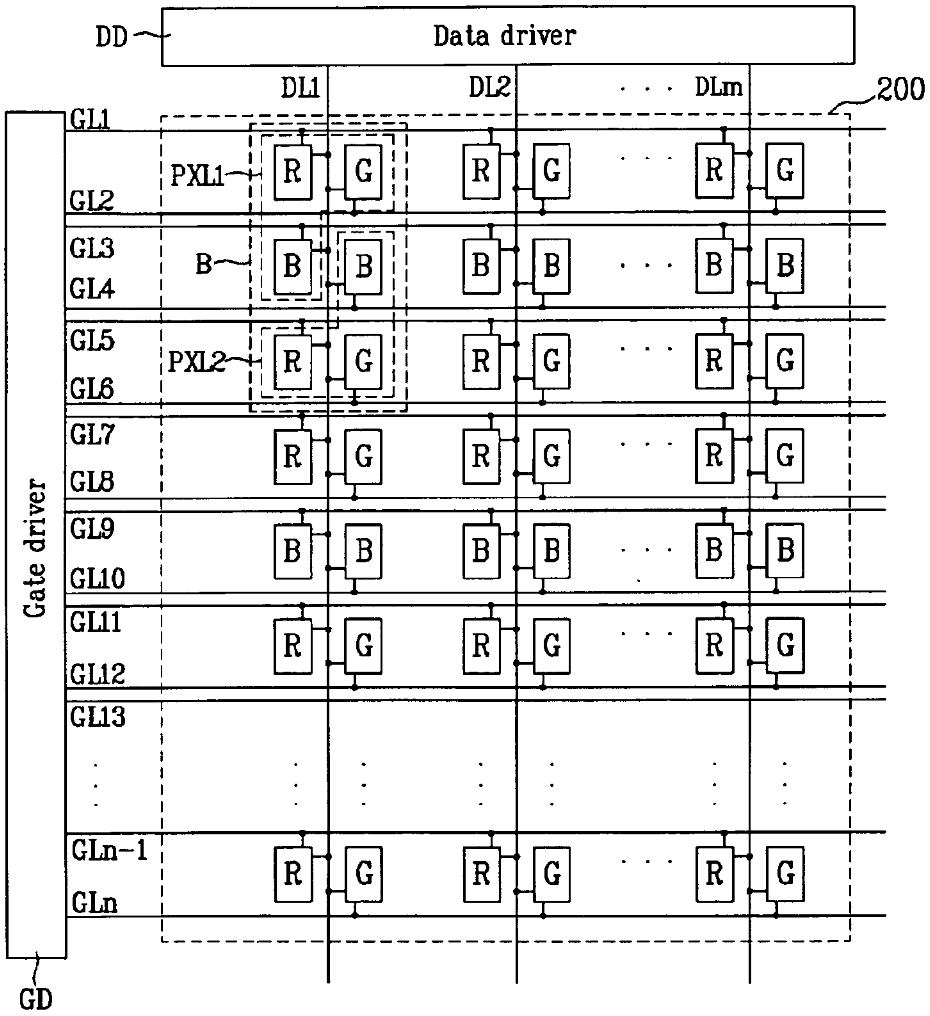
FIG. 5 is a diagram illustrating an active matrix type display device according to the second embodiment of the present invention.

FIG. 5 is a diagram illustrating an active matrix type display device according to the second embodiment of the present invention.

As shown in FIG. 5, the active matrix type display device according to the second embodiment of the present invention includes a panel having a plurality of pixel cells R, G, B to display images; and a gate driver GD and a data driver DD to drive the panel 200.

The panel 200 includes a plurality of gate lines GL1 to GLn and a plurality of data lines DL1 to DLm, wherein the gate line GL is orthogonal to the data line DL.

Between the '6n+1'th gate line and the '6n+2'th gate line being adjacent to each other, there are red and green pixel cells arranged alternately. At this time, the red and green pixel cells are positioned at both sides of each of the data lines. That is, the red pixel cell is positioned at the left side of each data line, and the green pixel cell is positioned at the right side of each data line.

Between the '6n+3'th gate line and the '6n+4'th gate line being adjacent to each other, there are blue pixel cells. At this time, the blue pixel cells are positioned at both sides of each of the data lines. That is, the predetermined pixel cell is positioned at the left side of each data line, and the other pixel cell is positioned at the right side of each data line.

Between the '6n+5'th gate line and the '6n+6'th gate line being adjacent to each other, there are red and green pixel cells arranged alternately. At this time, the red and green pixel cells are positioned at both sides of each of the data lines. That is, the red pixel cell is positioned at the left side of each data line, and the green pixel cell is positioned at the right side of each data line.

The advantages of the second embodiment of the present invention will be explained in more detail with reference to the accompanying drawings.

Figure 6:
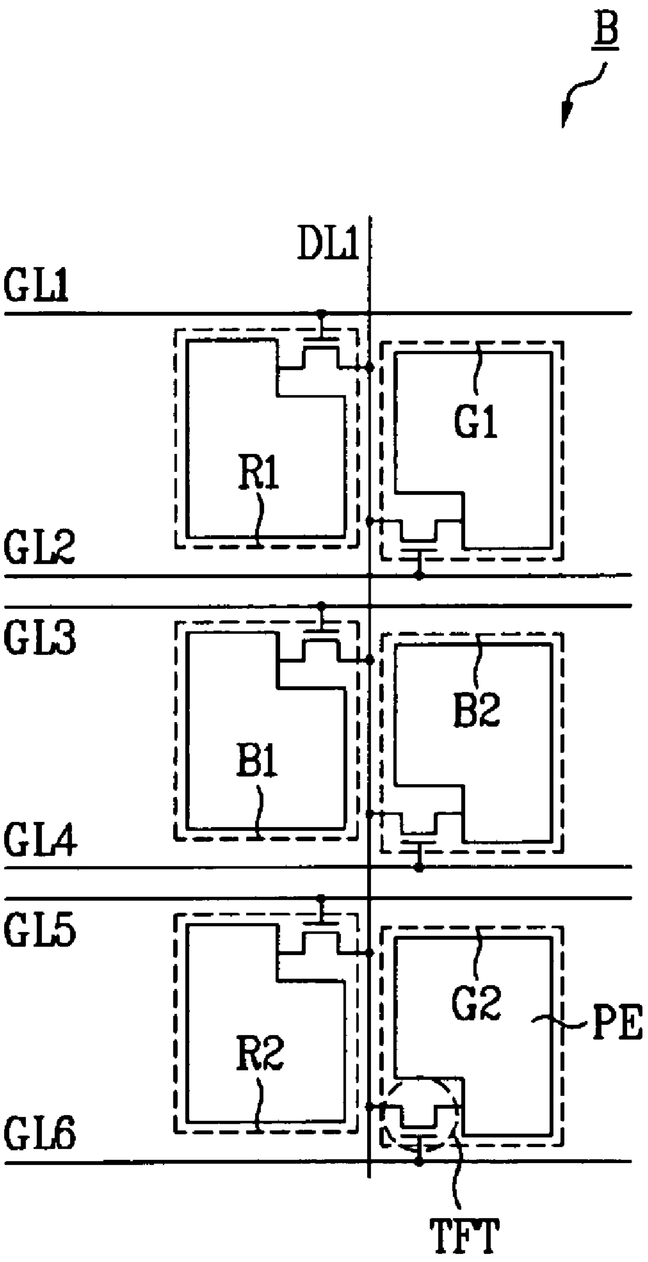
FIG. 6 is a diagram illustrating one exemplary structure in relation with first and second unit pixels shown in "B" block of FIG. 5.

FIG. 6 is a diagram illustrating one exemplary structure in relation with first and second unit pixels shown in "B" block of FIG. 5.

FIG. 6 shows the six pixel cells. In FIG. 6, for convenience of the explanation, the red pixel cell positioned uppermost is defined as the first red pixel cell R1, and the red pixel cell positioned lowermost is defined as the second red pixel cell R2. Also, the green pixel cell positioned uppermost is defined as the first green pixel cell G1, and the green pixel cell positioned lowermost is defined as the second green pixel cell G2. The blue pixel cell positioned at the left side is defined as the first blue pixel cell B1, and the blue pixel cell positioned at the right side is defined as the second blue pixel cell B2.

The first red pixel cell R1, the first green pixel cell G1 and the first blue pixel cell B1 constitute the first unit pixel PXL1. Also, the second red pixel cell R2, the second green pixel cell G2 and the second blue pixel cell B2 constitute the second unit pixel PXL2. At this time, the first red pixel cell R1 is connected to the first gate line GL1 and the first data line DL1. The first green pixel cell G1 is connected to the second gate line GL2 and the first data line DL1. The first blue pixel cell B1 is connected to the third gate line GL3 and the first data line DL1. The second blue pixel cell B2 is connected to the fourth gate line GL4 and the first data line DL1. The second red pixel cell R2 is connected to the fifth gate line GL5 and the first data line DL1. The second green pixel cell G2 is connected to the sixth gate line GL6 and the first data line DL1.

The first and second unit pixels PXL1 and PXL2 comprised of the six pixel cells form the block of 3*2. The first and second unit pixels PXL1 and PXL2 comprised of the six pixel cells are driven by the six gate lines and one data line. Meanwhile, in case of the related art of FIG. 1, the first and second unit pixels PXL1 and PXL2 comprised of the six pixel cells are driven by the two gate lines and the three data lines. Thus, the unit pixel included in the active matrix type display device according to the second embodiment of the present invention has four more gate lines and two less data lines than those of the unit pixel included in the related art liquid crystal display device. Accordingly, the active matrix type display device according to the second embodiment of the present invention is provided with the gate lines whose number is increased by 3 times and the data lines whose number is decreased by ⅓ times as compared with those of the related art liquid crystal display device.

For example, the active matrix type display device having XGA degree (resolution ratio of 1024*728) is provided with the 768 gate lines and the 3072 data lines. If this active matrix type display device having XGA degree is changed to the structure of the second embodiment of the present invention, the number of gate lines is increased to 2304 from 768, and the number of data lines is decreased to 1024 from 3072.

Although not shown, the pixel cells included in the first unit pixel PXL1 and the second unit pixel PXL2 may be defined with the other colors instead of the afore-designated colors.

For example, the pixel cell connected to the first gate line GL1 and the first data line DL1 may be defined as the first pixel cell; the pixel cell connected to the second gate line GL2 and the first data line DL1 may be defined as the second pixel cell; the pixel cell connected to the third gate line GL3 and the first data line DL1 may be defined as the third pixel cell; the pixel cell connected to the fourth gate line GL4 and the first data line DL1 may be defined as the fourth pixel cell; the pixel cell connected to the fifth gate line GL5 and the first data line DL1 may be defined as the fifth pixel cell; and the pixel cell connected to the sixth gate line GL6 and the first data line DL1 may be defined as the sixth pixel cell.

At this time, if the first pixel cell displays any one of the red, green and blue colors, the second pixel cell displays another of the two colors except the color displayed in the first pixel cell, and the third pixel cell displays the other except the two colors displayed in the first and second pixel cells. Also, if the fourth pixel cell displays any one of the red, green and blue colors, the fifth pixel cell displays another of the two colors except the color displayed in the fourth pixel cell, and the sixth pixel cell displays the other except the two colors displayed in the fourth and fifth pixel cells.

The first and fourth pixel cells may display the same color; the second and fifth pixel cells may display the same color; and the third and sixth pixel cells may display the same color. Also, the first and fifth pixel cells may display the same color; the second and fourth pixel cells may display the same color; and the third and sixth pixel cells may display the same color. Also, the first and sixth pixel cells may display the same color; the second and fifth pixel cells may display the same color; and the third and fourth pixel cells may display the same color.

For example, the first pixel cell may display the red color, the second pixel cell may display the green color, and the third pixel cell may display the blue color. The first pixel cell may display the red color, the second pixel cell may display the blue color, and the third pixel cell may display the green color. The first pixel cell may display the green color, the second pixel cell may display the red color, and the third pixel cell may display the blue color. The first pixel cell may display the green color, the second pixel cell may display the blue color, and the third pixel cell may display the red color. The first pixel cell may display the blue color, the second pixel cell may display the red color, and the third pixel cell may display the green color. The first pixel cell may display the blue color, the second pixel cell may display the green color, and the third pixel cell may display the red color.

Eventually, the first to third pixel cells may be positioned at any portions of the first unit pixel PXL1. Also, the fourth to sixth pixel cells may be positioned at any portions of the second unit pixel PXL2.

Figure 7:
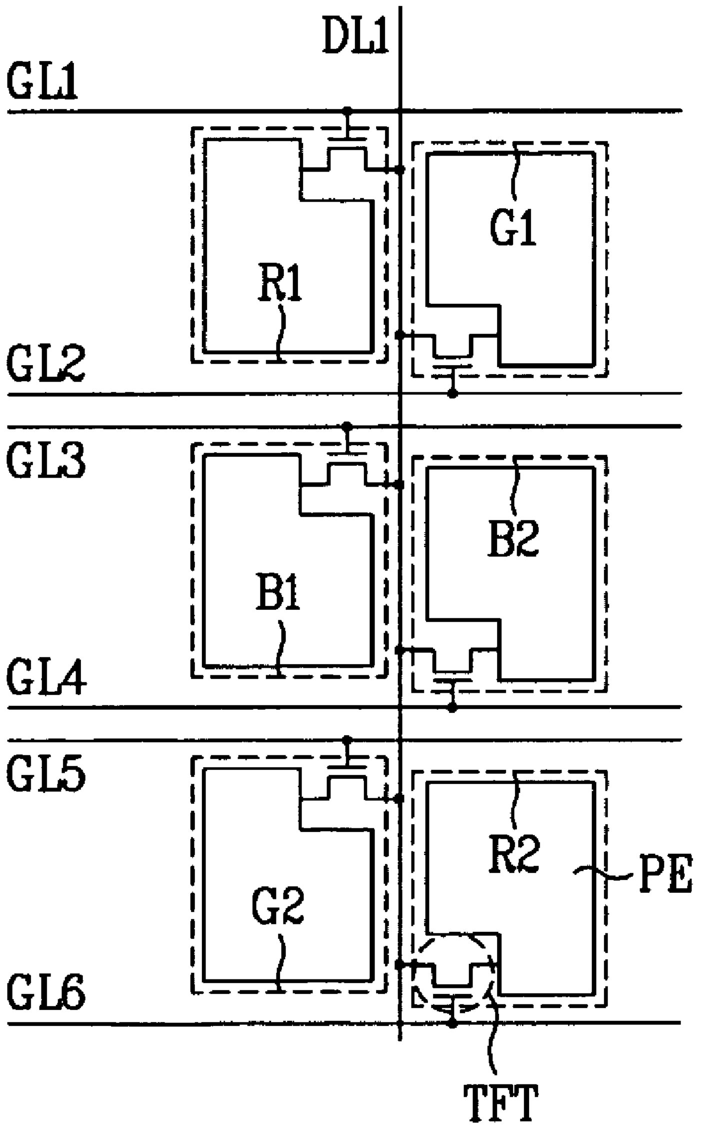
FIG. 7 is a diagram illustrating another exemplary structure in relation with first and second unit pixels shown in "B" block of FIG. 5.

FIG. 7 is a diagram illustrating another exemplary structure in relation with first and second unit pixels shown in "B" block of FIG. 5.

The position of the second green pixel cell G2 and second red pixel cell R2 of FIG. 6 may be changed to the position of FIG. 7. That is, as shown in FIG. 7, the second green pixel cell G2 may be positioned at the left side, and the second red pixel cell R2 may be positioned at the right side.

The structure according to the first and second embodiments of the present invention may be applicable to liquid crystal display device or electro-luminescence display device.

As mentioned above, the active matrix type display device according to the present invention has the following advantages.

The active matrix type display device according to the present invention increases the number of gate lines and decreases the number of data lines, whereby the gate driving integrated circuits to drive the gate lines are increased in number and the data driving integrated circuits to drive the data lines are decreased in number.

The present invention decreases the number of data driving integrated circuits which are relatively high-priced and increases the number of gate driving integrated circuits which are relatively low-priced, so that it is possible to reduce the total fabrication cost.

Especially, while increasing the number of gate driving integrated circuits which are easy to be formed in the display device, the number of data driving integrated circuits which are difficult to be formed in the display device is decreased so that it is possible to reduce the total fabrication cost.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An active matrix type display device comprising:

first to sixth gate lines arranged at one direction;

data lines arranged orthogonally to the first to sixth gate lines;

a first pixel cell connected to the first gate line and the data line;

a second pixel cell connected to the second gate line and the data line;

a third pixel cell connected to the third gate line and the data line;

a fourth pixel cell connected to the fourth gate line and the data line;

a fifth pixel cell connected to the fifth gate line and the data line; and a sixth pixel cell connected to the sixth gate line and the data line, wherein the three predetermined pixel cells of displaying the different colors among the first to sixth pixel cells constitute a first unit pixel for displaying a first unit image; and the three other pixel cells except the pixel cells included in the first unit pixel constitute a second unit pixel for displaying a second unit image;

wherein the first pixel unit includes the first to third pixel cells, and the second pixel unit includes the fourth to sixth pixel cells;

wherein the first pixel cell displays the red color, the second pixel cell displays the green color, the third pixel cell displays the blue color, the fourth pixel cell displays the blue color, the fifth pixel cell displays the red color, and the sixth pixel cell displays the green color;

wherein the first and second pixel cells are positioned between the first and second gate lines;

wherein the third and fourth pixel cells are positioned between the third and fourth gate lines;

wherein the fifth and sixth pixel cells are positioned between the fifth and sixth gate lines;

wherein a pixel electrode of the first pixel cell is positioned more closer to the first gate line than the second gate line while a pixel electrode of the second pixel cell is positioned more closer to the second gate line than the first gate line;

wherein a pixel electrode of the third pixel cell is positioned more closer to the third gate line than the fourth gate line while a pixel electrode of the second pixel cell is positioned more closer to the fourth gate line than the third gate line;

wherein a pixel electrode of the fifth pixel cell is positioned more closer to the fifth gate line than the sixth gate line while a pixel electrode of the second pixel cell is positioned more closer to the sixth gate line than the fifth gate line.

2. An active matrix type display device comprising:

first to sixth gate lines arranged at one direction;

data lines arranged orthogonally to the first to sixth gate lines;

a first pixel cell connected to the first gate line and the data line;

a second pixel cell connected to the second gate line and the data line;

a third pixel cell connected to the third gate line and the data line;

a fourth pixel cell connected to the fourth gate line and the data line;

a fifth pixel cell connected to the fifth gate line and the data line; and a sixth pixel cell connected to the sixth gate line and the data line, wherein the three predetermined pixel cells of displaying the different colors among the first to sixth pixel cells constitute a first unit pixel for displaying a first unit image; and the three other pixel cells except the pixel cells included in the first unit pixel constitute a second unit pixel for displaying a second unit image;

wherein the first pixel unit includes the first to third pixel cells, and the second pixel unit includes the fourth to sixth pixel cells;

wherein the first pixel cell displays the red color, the second pixel cell displays the green color, the third pixel cell displays the blue color, the fourth pixel cell displays the blue color, the fifth pixel cell displays the green color, and the sixth pixel cell displays the red color;

wherein the first and second pixel cells are positioned between the first and second gate lines;

wherein the third and fourth pixel cells are positioned between the third and fourth gate lines;

wherein the fifth and sixth pixel cells are positioned between the fifth and sixth gate lines;

wherein a pixel electrode of the first pixel cell is positioned more closer to the first gate line than the second gate line while a pixel electrode of the second pixel cell is positioned more closer to the second gate line than the first gate line;

wherein a pixel electrode of the third pixel cell is positioned more closer to the third gate line than the fourth gate line while a pixel electrode of the second pixel cell is positioned more closer to the fourth gate line than the third gate line;

wherein a pixel electrode of the fifth pixel cell is positioned more closer to the fifth gate line than the sixth gate line while a pixel electrode of the second pixel cell is positioned more closer to the sixth gate line than the fifth gate line.

* * * * *